June 15, 1926.
C. DE F. ORDWAY
1,589,215
APPARATUS FOR PRESERVING PERISHABLE SUBSTANCES
Filed April 4, 1925
2 Sheets-Sheet 1
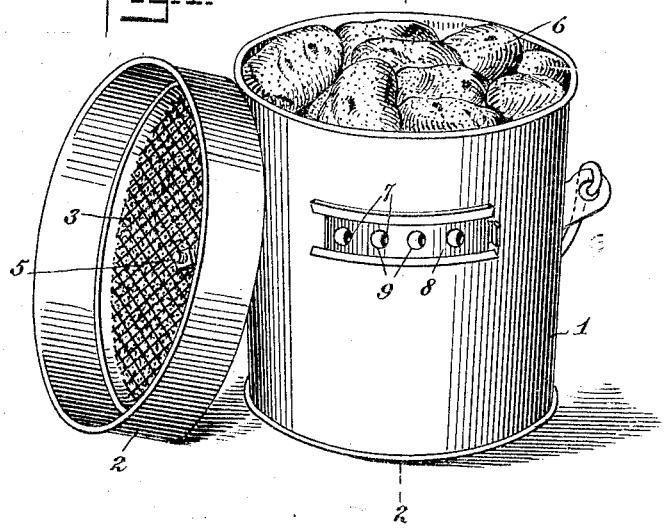
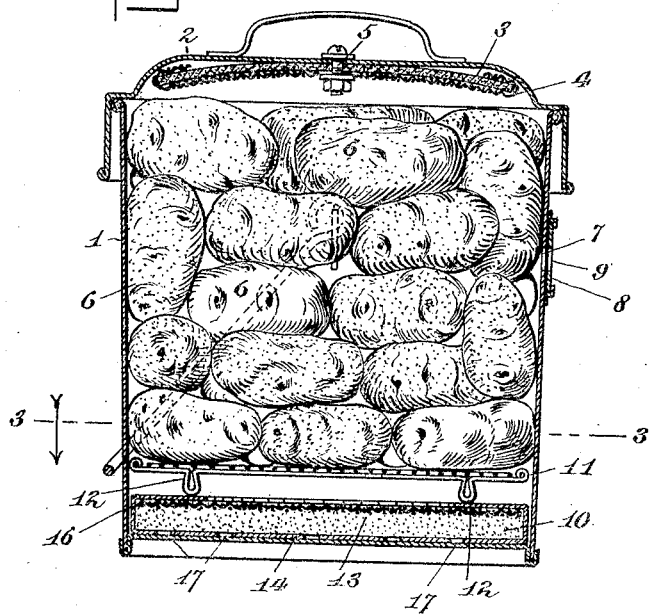
WITNESSES
INVENTOR
Charles D. Ordway
BY
ATTORNEY June 15, 1926.　　　　　　　　　　　　　　　　1,589,215
C. DE F. ORDWAY
APPARATUS FOR PRESERVING PERISHABLE SUBSTANCES
Filed April 4, 1925　　　2 Sheets-Sheet 2
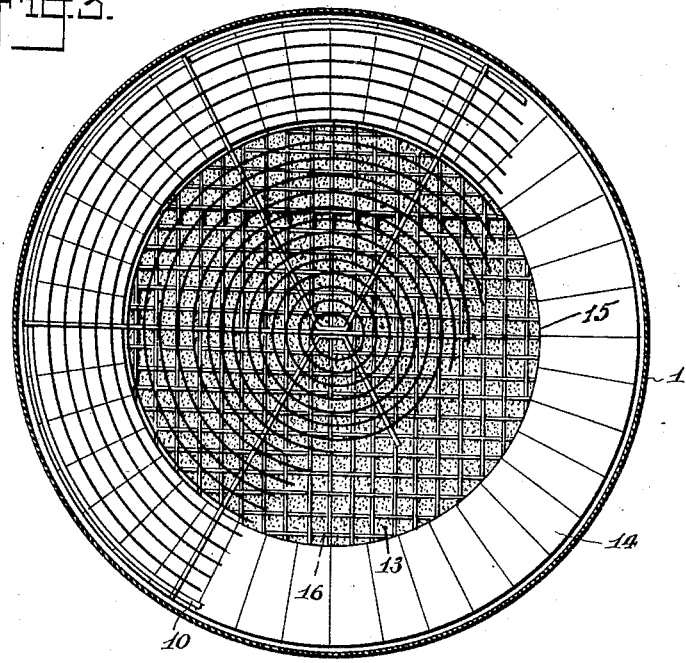
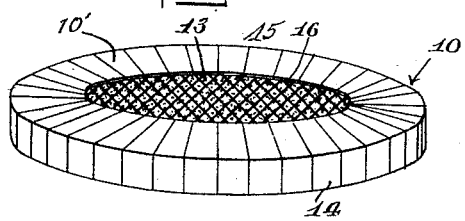
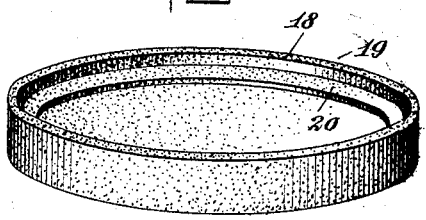
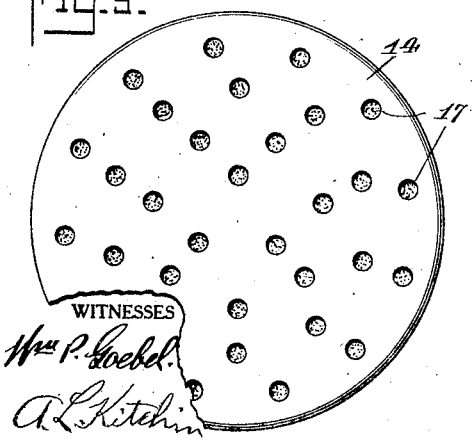
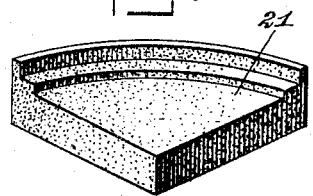
INVENTOR
Charles D. Ordway
BY
ATTORNEYS Patented June 15, 1926.

1,589,215

UNITED STATES PATENT OFFICE.

CHARLES DE FOREST ORDWAY, OF BURLINGTON, VERMONT.

APPARATUS FOR PRESERVING PERISHABLE SUBSTANCES.

Application filed April 4, 1925. Serial No. 20,853.

This invention relates to an apparatus and method for preserving perishable substances, as for instance, vegetables and fruits and has for an object to provide an improved construction wherein the parts may be caused to function properly and at the same time lend themselves to being cleaned and sterilized with a minimum effort.

A further object of the invention is to provide a preserving apparatus wherein an absorbing receiving member is provided and so arranged as to be readily removed at any time for cleaning and sterilizing.

Another object of the invention is to provide a preserving apparatus wherein a container is presented having removable preserving members made either in one piece or a plurality of pieces all capable of easy sterilizing.

In the accompanying drawings—

Figure 1 is a perspective view of an apparatus disclosing an embodiment of the invention, certain parts being shown removed and disconnected.

Figure 2 is a sectional view through Figure 1, approximately on line 2—2.

Figure 3 is a horizontal sectional view through Figure 2 on line 3—3, the same being on an enlarged scale.

Figure 4 is a perspective view of the preserving member shown in Figure 2.

Figure 5 is a bottom plan view of the preserving member shown in Figure 4.

Figure 6 is a perspective view similar to Figure 4 but showing a modified form of preserving member.

Figure 7 is a view similar to Figure 6 but showing a segment of a preserving member illustrating how the member may be divided into a number of parts and then assembled when in use.

Referring to the accompanying drawings by numeral, 1 indicates a container which may be of any material, including wood if properly enameled inside to prevent absorbing moisture, glass, earthenware and metal, and any shape or size, either to open at the top or have a door shutting tight, so if container has shelves to readily reach various kinds of fruits and vegetables on the different shelves without removing of same. This container is open at the top and is preferably provided with a comparatively tight fitting cover 2. Arranged in the cover 2 is a moisture absorbing member 3 which may be blotting paper, asbestos or other material, said absorbing member 3 being covered by a wire mesh 4 to prevent breakage and to properly hold the same in functioning position as shown in Figure 2. A bolt 5 is preferably provided and positioned to extend through the cover 2, absorbing member 3 and the wire mesh 4 whereby these members are all removably held in place.

As indicated in Figure 1, the absorbing member 3 is merely a disk of asbestos or any other absorbent to absorb a certain amount of moisture from the contents of the container 1. Under some circumstances, the vegetable or other substance 6 discharges too much moisture and to take care of this condition a number of apertures 7 are provided in the container 1 which are normally covered by the shutter 8 but the shutter may be adjusted so that the various apertures 9 in the shutter will register more or less with the apertures 7 and thereby provide a proper vent. Arranged at the bottom of the container 1 is what may be termed a preserving member 10 and on this is placed a grid 11 which is preferably formed of wire mesh and provided with several supporting legs 12 whereby the vegetable or other substance 6 will be supported a short distance above the preserving member.

In manufacturing the preserving member, the same may be made several different ways while following the same general principle of providing means which will absorb a given quantity of moisture and will, from time to time, absorb more or give off some of the moisture previously absorbed whereby the moisture content in the space occupied by the vegetables 6 will always be substantially constant and in this way cause the vegetables to be preserved or maintained in their original state.

As indicated in Figures 2 and 4, the preserving member 10 is provided with a filling 13 of absorbing material which may be asbestos fiber and fire clay or other desired material which will secure the same results. Surrounding the filling 13 is a covering member 14 which consists of a metal bottom having split upstanding sides and top. The top of the covering member 14 is provided with a large opening 15 which exposes a large percentage of the upper surface of the filling 13, which upper surface is covered by a wire mesh member 16. The various sections 10' formed by the cutting of the covering 14 may be readily bent to one side as the metal covering 14 is comparatively thin. When these sections are bent to a position out of the way, the wire mesh covering 16 may be removed and if desired, the filling 13 may be removed. In use, ordinarily these members are not removed but the entire preserving member 10 is placed in hot water and maintained there until the temperature thereof is substantially the same as the water, after which, it is placed in an oven and baked so as to positively kill all of the germs which may be adhered thereto. After this has been done and the preserving member cooled, a supply of water is provided for the filling 13 but preferably the filling 13 is not saturated in order that if there is an excess of moisture from the substance which is to be preserved, the filling 13 will absorb the same whereas if the reverse is true, the water in the filling 13 will be given off.

As indicated in Figure 5, the bottom of the cover 14 is provided with a number of apertures 17 in order to provide a better circulation when sterilizing and also when the device is in use.

In Figure 6, a preserving member 18 is provided formed of the same material as filling 13 or other desired material but provided with an annular flange 19 and a raised portion 20. When this form of preserving member is used, the grid 11 is merely caused to rest on the flange 19, or if desired, the feet 12 caused to rest on the raised portion 20.

In Figure 7, another form of the invention is provided wherein a segment 21 is presented which is preferably one-fourth of the structure shown in Figure 6 so that four segments or blocks of this kind will make a disk. The forms shown in Figures 6 and 7 will function properly when in use but the form shown in Figure 4 is preferable in that there will not be so much liability to chipping or breaking of the parts by reason of the metallic covering 14. After the parts have all been properly sterilized and the filling 13 provided with a certain quantity of water, the fruit or vegetables 6 may be then placed in position as shown in Figures 1 and 2. It is always preferable to place substantially a perfect fruit or vegetable in the container 1 and they should also be clean and substantially dry or rather in their natural condition. If the fruit or vegetables are to be preserved a long time, it is desirable to inspect the same from time to time and to open or close the shutter 8 according to the moisture evident when the device is examined. Also, from time to time, as for instance, at the end of each two months, the fruit or vegetables should be removed and the container, absorbing member 5 and preserving member 10 thoroughly sterilized and then the fruit or vegetables again placed in position as above described.

What I claim is:

1. In an apparatus of the character described, a preserving member comprising a porous substance, and means for protecting the same against breakage while permitting the substance to freely absorb and give off moisture, said means including a sheet metal plate fitting over the bottom of the preserving member with extensions extending over the edge and bent over the top of the preserving member, and a wire mesh covering for the upper surface of said preserving member.

2. In an apparatus of the character described, a preserving member comprising an absorbing body, a metallic covering therefor, and a foraminous protecting grid covering one surface, said covering member being formed with an enclosing edge structure capable of being bent to permit the porous member to be removed.

CHARLES DE FOREST ORDWAY.